A. M. MOE.
ADJUSTABLE SPRING WEED HOOK.
APPLICATION FILED FEB. 17, 1909.

947,119.

Patented Jan. 18, 1910.

Witnesses
Frank B. Hoffman
J. W. Garner

Inventor
Alfred M. Moe
By Victor J. Evans
Attorney

UNITED STATES PATENT OFFICE.

ALFRED M. MOE, OF PAGE, NORTH DAKOTA.

ADJUSTABLE SPRING WEED-HOOK.

947,119.  Specification of Letters Patent.  Patented Jan. 18, 1910.

Application filed February 17, 1909. Serial No. 478,384.

*To all whom it may concern:*

Be it known that I, ALFRED M. MOE, a citizen of the United States, residing at Page, in the county of Cass and State of North Dakota, have invented new and useful Improvements in Adjustable Spring Weed-Hooks, of which the following is a specification.

This invention is an improved adjustable spring weed hook for use in connection with plows to turn down weeds and other trash immediately in advance of the share and to cause the same to be covered by the mold overturned by the share as hereinafter described and claimed.

Figure 1:
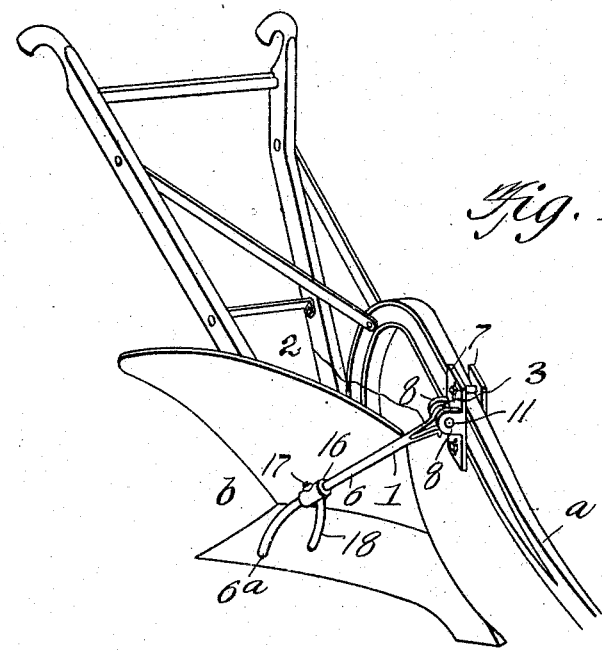
Figure 3:
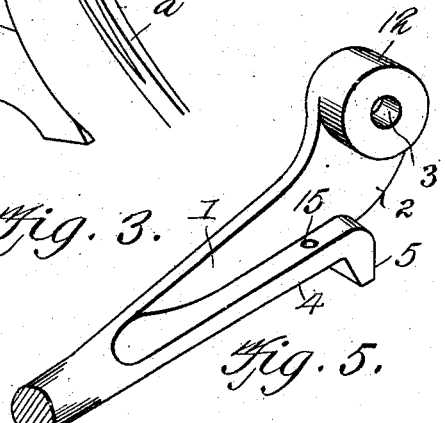
Figure 2:
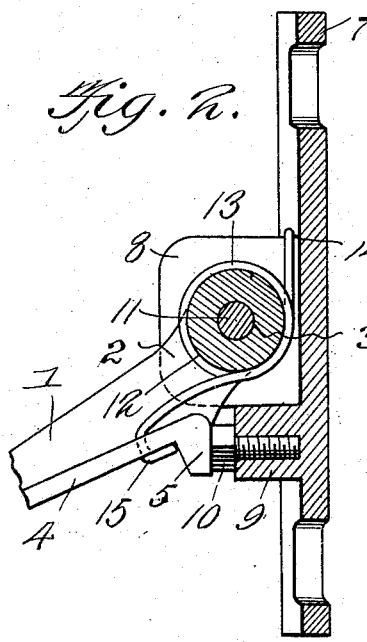
Figure 4:
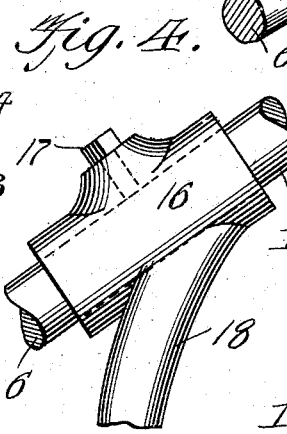
Figure 5:
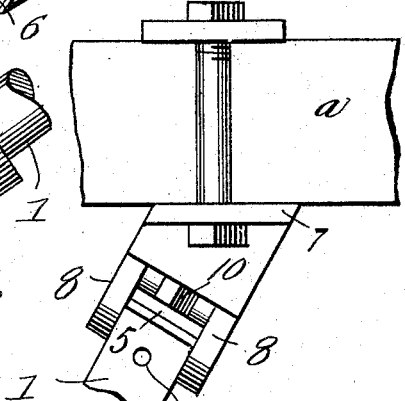

In the accompanying drawings:—Figure 1 is a perspective view of a plow provided with a weed hook constructed in accordance with my invention. Fig. 2 is a detail vertical sectional view of the attaching plate, looking forward, the pivotal portion of the arm of the weed hook being indicated in section and the upper portion of the said arm being indicated in outline in dotted lines. Fig. 3 is a detail perspective view of the upper portion of the arm of the hook. Fig. 4 is a detail elevation of the adjustable head which operates on the arm of the weed hook. Fig. 5 is an inverted plan of the attaching plate and of the upper end of the arm of the weed hook which is pivotally connected thereto.

In accordance with my invention, I provide an arm 1, the upper end of which is bent upwardly as at 2 and provided with a bearing eye 3. On the front edge of the arm is a flange 4 which projects laterally from one side thereof, and at the upper end of which is a downwardly extending stop arm 5. The intermediate portion 6 of the said arm is cylindrical and its lower end portion is curved forwardly as at 6ª.

To one side of the beam *a* of the plow is secured, as by means of bolts or other suitable fastening devices, an attaching plate 7 which carries at its center at opposite sides a pair of rearwardly inclined lugs or ears 8 which extend toward the plow share *b*. Immediately below the said ears or lugs is a shoulder 9 having a horizontal threaded opening which is engaged by a horizontally disposed adjusting screw 10, the head of which projects from the front side of said shoulder. The upper end of the arm is disposed with its eye between the said lugs and pivotally mounted between them on a bolt or pin 11 so that the outer end of said arm is movable vertically. On one side of the eye is a lateral cylindrical extension 12 around which are passed the coils of a spring 13. One end of the said spring is extended upwardly and engaged with the upper edge of one of the lugs 8 as at 14. The other end of the spring is extended downwardly and rearwardly and passed through an opening 15 in the flange 4 and caused to bear against the outer side of the stop arm 5. The action of the spring is to press downwardly on and maintain the arm 1 in the lowered inclined position indicated in Fig. 1 with its stop arm 5 in engagement with the head of the adjusting screw 10. By means of said adjusting screw, the angle of inclination of the said arm may be changed so that the said arm may be set in any desired position. While the spring serves to maintain the arm in lowered inclined position and while it is of sufficient strength to hold the arm in this position, when it encounters weeds or other yielding objects, the spring enables the standard to turn upwardly so as to clear rocks or other comparatively unyielding objects and hence avoid injury to the said arm or hook. On the lower intermediate portion of the arm is secured an adjustable head 16 which has an opening through which the cylindrical portion of the arm extends so that the head may be moved up or down on the said arm and the said head is provided with a set screw 17 to lock it at any desired elevation. The said head is provided on its front side with a forwardly extending, inclined arm or hook 18 which engages the weeds and trash and turns the same over in advance of the plow so as to cause the weeds and trash to be covered and buried by the mold overturned by the plow.

What is claimed is:—

1. A device of the class described comprising a plate for attachment to a plow beam and provided with pivotal devices and an adjusting device, a weed hook having an arm connected pivotally to the pivotal devices of the plate, said arm having a stop to engage the said adjusting device, and a spring to normally maintain the weed hook in operative position with the stop of its arm in engagement with the said adjusting device.

2. A device of the class described comprising a plate for application to a plow beam and provided with lugs and a shoulder below the lugs, said shoulder having a threaded opening, an adjusting screw engaged with said threaded opening, a weed hook having an arm provided at its upper end with an eye pivotally mounted between the said lugs, said arm having a laterally extending flange on its front side, means at its upper end and a stop extending downwardly from said flange, to bear on said adjusting screw, and a spring having coils extending around said eye of the hook arm, one end of the said spring being connected to the plate and the other end of the spring bearing on the said flange of the hook arm, said spring normally maintaining said hook arm in operative position.

In testimony whereof I affix my signature in presence of two witnesses.

ALFRED M. MOE.

Witnesses:
A. P. PAULSON,
M. GULBRANDSAN.